Jan. 14, 1969     C. B. LOWE     3,422,417
METAL BEARING FAILURE DETECTOR
Filed Feb. 2, 1968
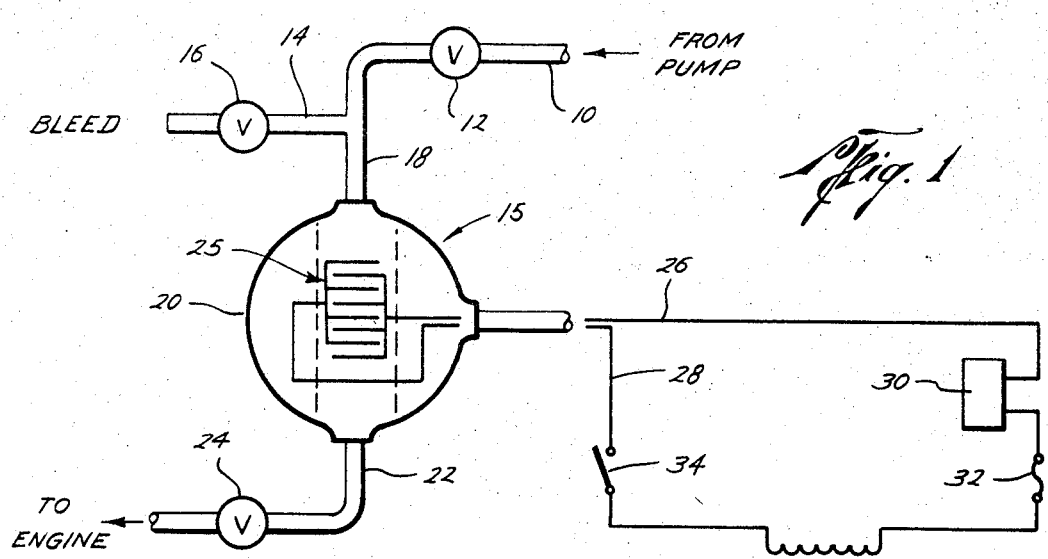
Fig. 1
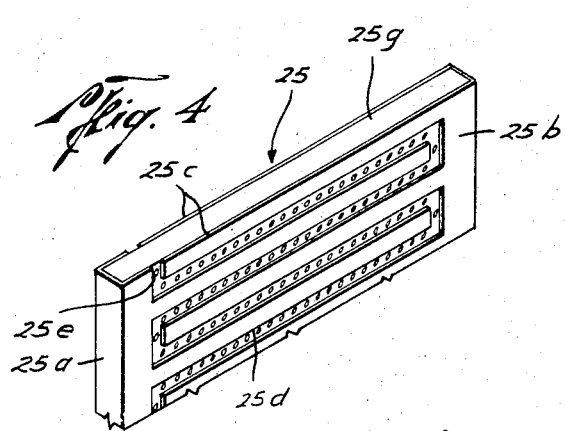
Fig. 4
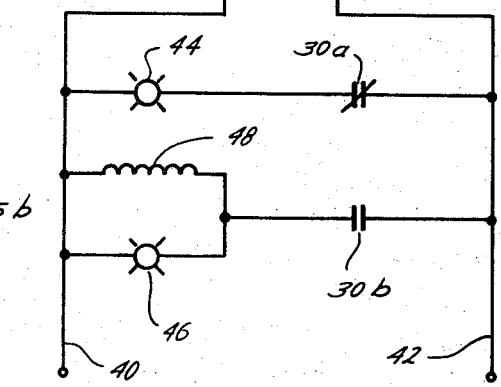
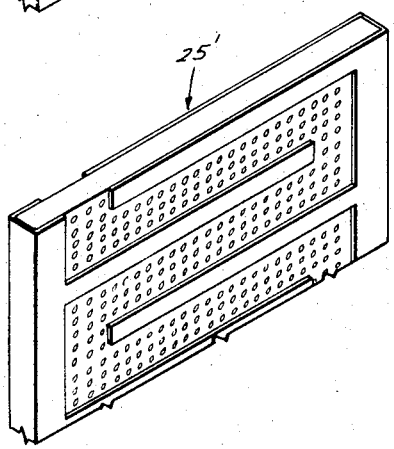
Fig. 5
Charles B. Lowe
INVENTOR.
BY Donald Gunn
ATTORNEY

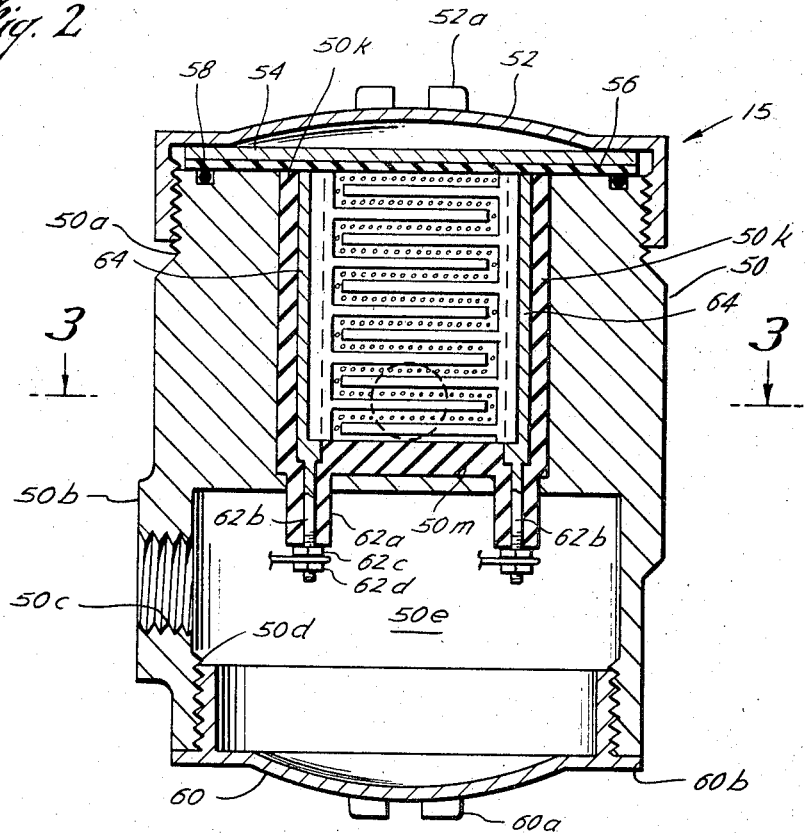
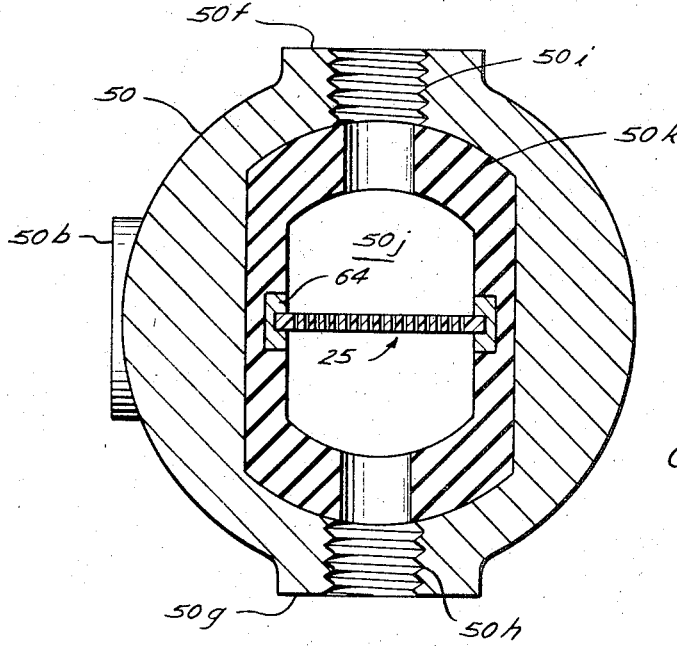

United States Patent Office 3,422,417
Patented Jan. 14, 1969

3,422,417
METAL BEARING FAILURE DETECTOR
Charles B. Lowe, P.O. Box 705, Bridge City, Tex. 77611
Continuation-in-part of application Ser. No. 444,186, Mar. 31, 1965. This application Feb. 2, 1968, Ser. No. 702,730
U.S. Cl. 340—270                  9 Claims
Int. Cl. G08b 21/00

ABSTRACT OF THE DISCLOSURE

For use with flowing lubrication oil from an engine or other rotary device wherein the lubricated components include bearings and the like susceptible of failure and enstreaming metal particles in the oil, an improved embodiment directing oil flow preferably through a printed circuit grid means having several electrodes spaced adjacent oil flow passages which are contacted by the particles in the oil to create an alarm signal, the apparatus incorporating removable grid means for service and for varying the sensitivity.

Related applications

The present application is a continuation-in-part of previously filed United States application Ser. No. 444,186, filed Mar. 31, 1965, now abandoned.

Summary of problem and solution

The problem to which the present device is directed is that of detecting bearing failure in rotating machinery. Typically, a lubrication system is provided in most rotating machinery such as engines, turbines, pumps and the like. The lubricating oil is supplied to various wear points which are protected by bearings and other friction reducing apparatus. A prelude to total bearing failure and seizure of the rotating apparatus is the detection of small metal particles in the lubricating oil. Depending on the size of the rotating equipment, many variables of the lubricating system, the metals of the various bearing assemblies, and other factors, the metal particles may be quite small or substantially large, and may vary in number from an occasional particle to a great number of particles indicative of failure conditions. In view of the great variety of the above circumstances, it will be understood and appreciated that a need has arisen for a metal bearing failure detector which is sensitive or responsive to particles of a given size or quantity, and which is not triggered by or responsive to a lesser number of particles in such circumstances.

The prior art has provided various and sundry devices which are believed wanting in the application described above. For instance, the device of Van Os shown in Patent No. 2,252,222 is sensitive and responsive to only one particle size, and has the further deficiency of being nonresponsive to particles rapidly carried through the apparatus and not lodging on the various detectors shown in that patent. The Krasnahira patent, No. 3,097,352, appears deficient in the same regards. The Lees et al. patent, No. 3,233,173, discloses a device of excessive complexity which appears to integrate the number of particles passing through a detector. It is believed that all of the devices noted herein are deficient in the structure presently summarized as including a housing means adapted to be connected downstream from an oil pump before filtering wherein a chamber is adapted to receive a removable grid element preferably formed on a printed circuit board having a plurality of perforations spaced relative to conductive members and adapted to be contacted by metal particles in the oil flow. Said apparatus further incorporating a suitably insulated mounting for said grid element and a pair of conductive members extending therefrom and terminating within an explosion-proof chamber to be suitably connected to conduits to alarm indicating apparatus.

Several objects and advantages of the present invention will become more readily apparent to those reading the below following specification and included drawings, wherein:

FIG. 1 is a schematic drawing illustrating installation of the present invention;

FIG. 2 is a sectional view taken along the major axis of the cylindrical housing of the present invention;

FIG. 3 is a sectional view taken along the line 3—3 of FIG. 2 illustrating details of the chamber within the housing of the present device;

FIG. 4 is an isometric view of a removable and insertable particle detecting means placed in the housing illustrated in FIG. 2; and FIG. 5 is an isometric view of an alternative detecting means similar to that shown in FIG. 4 wherein the varied spacing alters the sensitivity of the apparatus.

Attention is first directed to FIG. 1 of the drawings which illustrates a flow conduit 10 communicated to a suitable valve 12 input to the particle detection means 15. The oil flow is from the pump of a suitable rotary apparatus which requires lubricating oil for the various bearings and other assemblies. Preferably, the oil is passed through the detection apparatus 15 downstream from the pump but before filtering and return to the engine. A suitable bleed line 14 communicating through a valve 16 is included with the present device if needed. Passage means through the present apparatus 15 is provided wherein the line 18 is input to one side of the tubular housing 20 and a suitable outlet line 22 is returned to the engine (not shown) through a suitable valve means 24.

Briefly, interleaved conductive members indicated generally at 25 are adapted to be positioned in the flow from the conduit 18 to the conduit 22 and are sensitive to metal particles carried in the lubricating oil. Appropriate signals are formed on a pair of output conductors 26 and 28. The conductors communicate with a relay 30 connected in series with a suitable fuse 32 and an off-on switch 34 and the primary of a signal voltage transformer 36. A pair of conductors 40 and 42 communicated with a suitable commercial voltage source connect to the primary of the transformer 36 which steps the voltage down to a lower voltage level to avoid the danger of placing a dangerous voltage in the grid detection means 25 of the present apparatus. Preferably, a green lamp or other indicating device 44 signifies the continued operation of the engine protected by the present device and it is controlled by the normally closed relay contacts 30a to form an indication for an observer of the condition of the engine or other rotary apparatus. On the other hand, a red lamp 46 or other suitable alarm device is controlled by the normally open relay contacts 30b. In parallel with the warning device 46 is a shut down solenoid indicated by the numeral 48 which is adapted to communicate suitable signals to control equipment shutting down the rotary apparatus to prevent further damage from bearing failure.

The foregoing describes the installation of the present invention. Of particular interest is the fact that the relay 30 maintains the operative lamp 44 on for an extended time while switching off the devices 46 and 48 so long as the equipment operates satisfactorily. However, on formation of metal particles in the lubricating oil before failure of a bearing, the detection means 25 forms a signal operating the relay 30 and reversing the relay contacts 30a and 30b. The above noted normal conditions of the relay contacts 30a and 30b are achieved during quiescent operative conditions in which the engine or other rotary apparatus is operative without any particles in the oil impinging on the detection means 25.

While the foregoing states many operative principles of the present invention, it is believed that a more complete understanding thereof is obtained from considering the structure as shown in sectional view in FIG. 2. The metal bearing detector apparatus 15 incorporates a suitable cast body 50 which has an explosion-proof chamber sealed by a removable cap 52 which is engaged and pulled snug against the cast body 50 by the threads 50a. The cap 52 incorporates suitable wrench flats appended at the center at 52a for ease of engagement with a hand tool. Internally, the cap 52 has a shoulder for seating a preferably circular metal plate 54 which is co-terminous with a gasket 56 of appropriate insulating material. An encircling slot for receiving an O-ring 58 forms a leak-proof seal on closing the top 52 wherein a chamber, as described hereinafter, is adapted to receive oil under pressure and yet without leaks or danger or explosion by virtue of the seal maintained by the O-ring assembly 58 bearing against the resilient member 56.

The housing member 50 is generally cylindrical except for the various pipe or conduit fittings as noted hereinafter. FIG. 2 illustrates a flat 50b having a centered, threaded opening 50c for receiving an electrical conduit cable on suitable connection thereto. The lower end of the housing member 50 has an internally threaded opening at 50d for receiving an externally threaded cap member 60. The cap member 60 has additional hand tool engaging means at 60a for ease of removal and insertion, and incorporates a wide shoulder 60b which is adapted to seat snugly against the lowermost shoulder of the housing member 50. Internally of the lower cap 60 and filling perhaps the lower one-third of the housing member 50 is a protected chamber 50e which is adapted to form an explosion-proof housing for connection of appropriate electrical terminals and the like as will be described.

Briefly, insulating material comprising a pair of terminal posts 62a surround a pair of internal conductors 62b. The internal conductors protrude from the lower end of the insulating posts 62a and are adapted to receive a lock nut thereon indicated by the numeral 62c. A spade terminal, a loop of wire, or other suitable means is placed around the post of the terminal 62b and locked in position by a nut 62d. More will be noted concerning connection of the wires 26 and 28 (see FIG. 1) to the terminals 62b hereinafter.

Attention is next directed to FIG. 3 of the drawings which illustrates protrusions formed on the housing at 50f and 50g and which are tapped with a threaded opening at 50i and 50h, respectively. The openings 50i and 50h are adapted to be threadedly joined with suitable conduits, and referring to FIG. 1, the conduits 18 and 22 preferably supply the lubricating oil through the chamber to be described. The threaded openings 50i and 50h are in axial alignment preferably, and are interrupted centrally of the housing 50 by a relatively large chamber 50j. The chamber 50j is surrounded on all sides by insulating material indicated by the numeral 50k. The material 50k preferably lines the side wall of the chamber 50j and the lower surface 50m of the chamber.

In FIG. 3, two U-shaped channels 64 are placed in opposite side walls of the insulation material 50k facing one another so as to position the detection means 25 in a plane approximately perpendicular to the flow of lubricating oil through the chamber 50j. Preferably, the U-shaped channels 64 extend to the upper end of the chamber 50j and are contacted against the insulating material of the gasket 56 beneath the cap 52. The U-shaped channels 64 terminate at their lower ends in the terminal conductors 62b which extend downwardly and into the explosion-proof chamber 50e. Preferably, each of the channels is fully insulated at all points by the material 50k, the gasket 56, and the insulating post 62a to isolate electrical connections to the channels.

Attention is directed to FIG. 4 of the drawings which illustrates the detection means 25 in greater detail. Preferably, the detection means 25 is formed on a printed circuit board of suitable insulating material 25g having appropriately located conductive strips at 25a and 25b. As further shown in FIG. 4, the strips 25a and 25b are preferably U-shaped to surround the opposite edges extending longitudinally of the printed circuit insulating material 25g. This provides three faces of contact with the U-shaped channels 64 described hereinabove.

Each of the conductive strips 25a and 25b is connected to a plurality of interleaved conductive members indicated by the numerals 25c and 25d. It is possible to form conductive members on both faces of the insulating material 66 so that the detection means 25 is adapted to be faced in either direction when placed in the channels 64. The members 25c and 25d extend across the face of the means 25 from the edge-located conductive strips 25a and 25b subject to the limitation that the various interleaved members do not touch. The conductive strips are spaced apart from one another and a plurality of small passages 25e are drilled between adjacent opposite conductive strips 25c and 25d.

In customary installations, either the strip 25a or 25b is made positive with respect to the other. Since an indication is obtained by a metal particle which bridges between adjacent interleaved conductive members, the holes or openings 25e direct fluid flow toward the strips wherein particles carried in the lubricating oil are abutted against the face of the detection means 25, and, on contact against conducting members 25c and 25d, form a short therebetween which causes suitable current flow for the alarm apparatus.

In further particular, the detection means 25 of the present invention is preferably a rectangular insert filling the chamber from the insulating material 50m at the bottom of the chamber 50j and having sufficient height to fit snugly against the lower side of the gasket 56 carried beneath the cap 52. Since the width is sufficient to lock within the U-shaped channels 64 at opposite sides, and upon closing the cap to snugly press against the upper end of the detection means, the oil must flow through the plurality of passages 25e. The flow carries the metal particles in the lubricating oil to the near vicinity of the conducting strips 25c and 25d through which an alarm condition is initiated. Oil flow directed toward the detection means 25 emerges from the conduit opening which is partially obscured in FIG. 2 by the metal detection means 25.

From fundamentals of hydraulics, it will be understood that the conduit system communicating with the chamber within the housing means 50 has an effective cross-sectional area for purposes of measuring the rate of flow of the lubricating oil. In the first embodiment of the detection means 25 illustrated in FIG. 4, the drilled openings 25e are sufficient in number to have an effective cross-sectional area greater than that of the conduit. This prevents back pressure at the particle detecting means 25 and further describes a device not susceptible to blockage since any number of the small openings may be closed and still a substantial flow path for the lubricating oil is available.

Attention is next directed to FIG. 5 of the drawings which illustrates the means 25' having nomenclature similar to the structure shown in FIG. 4. Of significant interest in FIG. 5 is the wider spacing of the conductive strips interleaved across the face of the detection means 25'. The number of openings through the grid means 25 is increased to enable substantial flow of lubricating oil through the means 25'. The wider spacing of FIG. 5 alters the accumulation of particles before detection. For instance, the present invention may be installed with rotating apparatus which routinely forms small metal particles of no particular consequence in the lubricating oil. Since small particles are considered non-critical, the detection means 25' of FIG. 5 should be used. The small particles are insufficient to bridge the spacing of adjacent interleaved conductive members. At some juncture, the continued flow of small metal particles in the oil may become critical, and to this end, adjacent conductors are bridged by a number of particles whereby the alarm condition is indicated. By way of contrast, the structure of FIG. 4 captures small metal particles in minimum quantity to sound the alarm before possible failure of the bearings in the rotating equipment. Of particular interest to the contrast of the detection means 25 and 25' is the fact that the size and number of particles required before an alarm starts is substantially varied by the spacing of the interleaved conductive strips.

In some installations, it may be necessary to drill slightly larger openings through the detection means 25 so that exceedingly small particles are passed by the apparatus without alarm indications and are removed by the oil filter down-stream from the metal detection apparatus 15. On the other hand, the openings 25e may be substantially smaller. In all cases, the number of openings 25e is preferably sufficient that the total effective cross-sectional area is approximately eqaul to that of the conduit, or is even greater.

Note should be taken of operation of the device of the present invention in typical installations. The housing means 50 is installed by appropriate fittings to the conduits 18 and 22 as shown in FIG. 1. A suitable detection means 25 is placed within the chamber 50j (see FIG. 3) and the cap 52 is screwed tightly on the apparatus. The appropriate wiring is connected as shown in FIG. 1 and the switch 34 is then closed. After opening the valves 12 and 24, unfiltered lubricating oil passes through the present apparatus. The oil enters the large chamber 50j and passes through the detection means 25. Metal particles in the oil are trapped and detected by the means 25 as discussed hereinabove. Because of the variation in the construction in the means 25, the particles may be so small as to pass through the holes in the means 25, the metal conductors may be widely or narrowly spaced, as needed, to control accumulation of the particles required for an alarm indication, and the apparatus continues in operation until a short is obtained between adjacent conductive members of opposite polarities.

When a short is created by metal particles in the lubricating oil, current flows in the conductors 26 and 28 to operate the relay 30 shown in FIG. 1. The signal voltage through the relay 30 opens the relay contacts 30a which extinguishes the operate lamp 44. The relay contacts 30b are closed and the trouble lamp 46 is ignited while the engine shut-down solenoid 48 is likewise operated. The solenoid 48 is preferably connected to equipment (not shown) responsive to the alarm from the present invention for shutting down the equipment prior to total failure of the bearing and the consequential extensive damage.

The device of the present invention provides a detection means which is adapted to be sized and adjusted to various circumstances related to failure conditions of the particular bearing assemblies found in the rotating apparatus. Moreover, the device of the present invention is a detection means which is easily accessible for periodic cleaning upon removal of the cap. The detection element 25 slides easily from the chamber for easy cleaning. A substitute element is inserted in the channels 64 or the original device may be quickly brushed and returned to the chamber means 50j. From time to time, it may be necessary to substitute means 25' having a different screening action in the chamber 50j.

Of particular interest to the present invention is the further fact that an explosion-proof chamber is furnished for connection of the appropriate wires for the alarm system. Since the atmosphere where large pumps and other engines are used is often subject to ignition, the device of the present invention incorporates suitable facilities for explosion-proof operation.

While many alterations and variations of the present invention may suggest themselves, the scope of the present invention is preferably determined by the claims appended hereto.

What is claimed is:
1. Metal detection apparatus cooperative with a flowing souce of lubricating oil having metal particles therein on occasion of a part failure, comprising:
  (a) housing means having a chamber therein;
  (b) connective means for flowing lubricating oil from a source through said chamber;
  (c) openable means sealably closing said chamber for providing access thereto;
  (d) metal particle detection means;
  (e) guide means within said chamber for removably positioning said detection means generally perpendicular to oil flow through said chamber;
  (f) said detection means including conductive members extending over portions of the surface of said detection means facing the oil flow, said guide means and conductive members comprising a pair of electrically insulated means adapted to be contacted by metal particles in the oil flowing through said chamber;
  (g) opening means associated with said detection means for directing oil flow through said insulated means for contacting metal particles thereagainst; and,
  (h) alarm circuit means for providing an indication of contact of metal particles against said insulated means, said circuit means adapted to be communicated from said housing means by insulated terminal means.

2. The invention of claim 1, including:
  (a) printed circuit means having conductive members communicated with said guide means;
  (b) interleaved conductive members on said printed circuit means; and,
  (c) a plurality of openings formed in said printed circuit means and being located at selected places with respect to said conductive members for directing oil flow therethrough and in close proximity to said conductive members.

3. The invention of claim 1 wherein said detection means is slidably removably from said guide means which are secured within said chamber by insulating material to prevent electrical communication to said housing means.

4. The invention of claim 1 wherein said detection means includes printed circuit means having a plurality of openings therethrough.

5. The invention of claim 1 wherein said connective means has a flow capacity at least partially determined by the effective cross sectional area thereof and wherein said opening means has an effective cross sectional area at least equal to that of said connective means.

6. The invention of claim 1 wherein said detection means includes a plurality of printed circuit means having interleaved conductive members and a plurality of openings therethrough, said openings and said conductive members being positioned and arranged to be responsive to various sizes and quantities of metal particles to cause said alarm circuit means to operate.

7. The invention of claim 1 wherein said chamber has an internal surface of insulating material and wherein said guide means are comprised of a pair of generally parallel channel means facing one another, said insulating material isolating same from said housing means.

8. The invention of claim 1 wherein said alarm circuit means includes a terminal means received within explosion-proof housing means.

9. The invention of claim 8 including insulating material securing said terminal means from said housing means and conductive means connecting said terminal means to said guide means which form an electrical connection to said conductive members, said conductive members forming first and second circuit means connected on accumulation of metal particles by said detection means.

References Cited

UNITED STATES PATENTS

| 2,252,222 | 8/1941 | Van Os | 200—61.09 |
| 3,097,352 | 7/1963 | Krasnahira | 340—270 X |

JOHN W. CALDWELL, *Primary Examiner.*

D. L. TRAFTON, *Assistant Examiner.*

U.S. Cl. X.R.

200—61.09